United States Patent [19]
Omori et al.

[11] Patent Number: 5,137,398
[45] Date of Patent: Aug. 11, 1992

[54] DRILL BIT HAVING A DIAMOND-COATED SINTERED BODY

[75] Inventors: Naoya Omori; Hideki Moriguchi; Toshio Nomura, all of Hyogo, Japan

[73] Assignee: Sumitomo Electric Industries, Ltd., Osaka, Japan

[21] Appl. No.: 691,446

[22] Filed: Apr. 25, 1991

[30] Foreign Application Priority Data

| Apr. 27, 1990 [JP] | Japan | 2-114747 |
| Apr. 27, 1990 [JP] | Japan | 2-114748 |
| Oct. 5, 1990 [JP] | Japan | 2-269214 |
| Mar. 29, 1991 [JP] | Japan | 3-67066 |

[51] Int. Cl.$^5$ .......................... B23B 51/00; B23B 27/20
[52] U.S. Cl. ......................................... 408/145; 51/295; 51/308; 175/420.2; 407/110; 407/119; 408/144; 408/233; 408/713; 501/90
[58] Field of Search ............... 408/144, 145, 231, 233, 408/713; 407/110, 119; 51/293, 307–309, 295; 501/89–92; 428/698–701; 175/329, 330

[56] References Cited

U.S. PATENT DOCUMENTS

| 4,744,704 | 5/1988 | Galvefors | 408/144 |
| 4,909,677 | 3/1990 | Noguchi et al. | 407/110 X |

FOREIGN PATENT DOCUMENTS

| 58-143115 | 9/1983 | Japan . | |
| 122785 | 7/1985 | Japan | 408/145 |
| 1109628 | 5/1986 | Japan | 408/145 |
| 1159302 | 7/1986 | Japan | 407/119 |
| 61-291493 | 12/1986 | Japan . | |
| 62-218010 | 9/1987 | Japan . | |
| 62-46489 | 12/1987 | Japan . | |
| 62-292307 | 12/1987 | Japan . | |
| 63-38501 | 2/1988 | Japan . | |
| 63-38502 | 2/1988 | Japan . | |
| 306805 | 12/1988 | Japan | 408/145 |

Primary Examiner—Steven C. Bishop
Attorney, Agent, or Firm—W. G. Fasse

[57] ABSTRACT

A drill bit of a diamond-coated sintered body has a substrate mainly composed of $Si_3N_4$ or SiC. At least a wear portion of the bit is coated with a diamond layer. If the bit is of the throw-away kind, an insert is removably secured to a shank. At least the insert or a wear portion thereof is coated with a diamond layer. The sintered body contains a prescribed amount of a sintering assistant or aid selected from MgO, $Y_2O_3$ and the like. The diamond coating layer has a thickness of at least 0.1 μm.

23 Claims, 5 Drawing Sheets

DRILL BIT HAVING A DIAMOND-COATED SINTERED BODY

FIELD OF THE INVENTION

The present invention relates to the structure of a drill bit which is mainly used for drilling a light alloy such as an Al-Si alloy, a fiber reinforced light alloy, a nonmetal such as plastic, FRP (fiber reinforced plastic) or graphite, a printed circuit board or the like, and more particularly, it relates to the structure of a high-quality drill bit having a diamond-coated sintered body, which is excellent in wear resistance and toughness.

BACKGROUND INFORMATION

Figure 1:
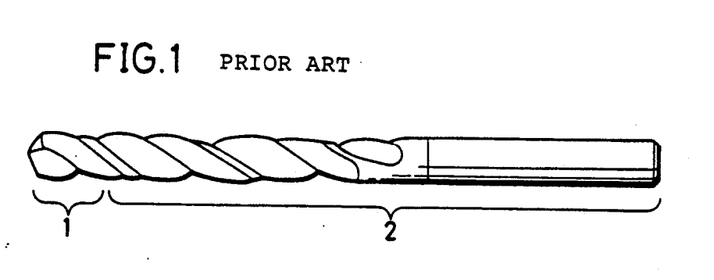
FIG. 1 is a structural diagram showing a conventional twist drill.

A drill bit is a cutting tool for drilling steel products and the like. FIG. 1 shows an exemplary structure of a twist drill bit. The twist drill bit is formed by a cutting portion 1 for performing the drilling, and a shank 2 which is not concerned with the cutting but mainly adapted to discharge chips and is mounted in a chuck of a cutting machine such as a drilling machine.

In general, materials for drills are made of high-speed steel and cemented carbide. The high-speed steel, which is excellent in toughness but inferior in wear resistance, is not suitable for high-speed cutting. On the other hand, cemented carbide, which is excellent in wear resistance and tool accuracy characteristics but brittle, may cause breakage when the same is used in a machine tool having low rigidity, for example.

In order to improve such materials, there has been proposed a structure attained by coating a cutting portion of high-speed steel with hard TiN and a structure attained by brazing a cutting portion of cemented carbide.

In recent years, there have been proposals of a structure attained by brazing different cemented carbide materials (P30 and D30) for improving the wear resistance and the toughness as disclosed in Japanese Utility Model Laying-Open No. 58-143115 (1983), or metallurgically integrating/connecting such different materials as disclosed in Japanese Utility Model Publication No. 62-46489 (1987), a drill bit of a double structure whose central and outer peripheral portions are made of different cemented carbide materials in consideration of the different characteristics required for such portions as disclosed in Japanese Patent Laying-Open No. 62-218010 (1987), or a method of attaining such a double structure by injection molding as disclosed in Japanese Patent Laying-Open No. 63-38501 or 38502 (1988). There has also been proposed a structure attained by preparing a material for a drill bit of a cermet Ti-base cemented carbide in order to improve the adhesion resistance, as disclosed in Japanese Patent Laying-Open No. 62-292307 (1987).

On the other hand, diamond, which has a number of excellent characteristics such as an extremely high hardness, a chemical stability, and a high thermal conductivity, has been widely applied as a hard material itself, or for coating a hard material with diamond or with carbon having a diamond-structure. Examples of conventional diamond tools are cutting tools such as a throwaway tip, a drill bit, a microdrill bit and an end milling cutter for working various light metals and alloys thereof or plastic materials, and various wear resistant tools such as a bonding tool employed for packaging a chip-type component.

Several methods are known for preparing or forming artificial diamond which is applied to manufacturing of such tools. These methods involve $\alpha$ wave plasma CVD, RF-plasma CVD, EA-CVD, magnetic field $\alpha$ wave plasma CVD, RF heat plasma CVD, DC plasma CVD, DC plasma jet CVD, filament heat CVD, and a combustion method. These methods can be used for the formation of diamond coating layers from vapor phases. These are prevailing methods of preparing diamond-coated hard materials.

A hard base material useful to be diamond-coated to provide a high adhesion strength between the hard base material and the diamond coating is selected to have a thermal expansion coefficient identical to the thermal expansion coefficient of diamond. Japanese Patent Laying-Open No. 61-291493 (1986) proposes using as a hard base material a sintered body which is mainly composed of $Si_3N_4$ or SiC.

In general, an Al-Si alloy or a printed circuit board has been perforated by a WC-based cemented carbide drill bit, or a drill bit of surface-coated WC-based cemented carbide which is prepared by coating the surface of such a WC-based cemented carbide drill bit with a single ply or with multi-plies hard coating layer or layers of a carbide, a nitride and/or a carbo-nitride of Ti, Zr or the like in a thickness of 0.2 to 20 $\mu$m by chemical vapor deposition such as ordinary CVD or physical vapor deposition such as ion plating or sputtering. In particular, a printed circuit board has been perforated by a so-called microdrill, which is formed of a material similar to the above but having a relatively small diameter.

In recent years, however, a labor reduction and a speed increase have been required for perforation of an Al-Si alloy and a printed circuit board, under strict drilling conditions. Under such severe conditions, the useful life of the aforementioned WC-based cemented carbide drill bit has ended in an extremely short time when the same is used for perforating an Al-Si alloy or a printed circuit board, due to significant wear. Also in the drill bit made of surface-coated WC-based cemented carbide, it is impossible to attain a desired cutting performance since its hard coating layer may be significantly worn in a short time to cause separation of the coating or chipping.

Although an attempt has been made to coat the surface of a WC-based cemented carbide drill bit with a diamond coating layer by a well-known low-pressure vapor phase synthesizing method, such a technique has not yet been put into practice for the following reasons:

(1) Graphite having a low wear resistance is apt to precipitate on the surface of Co contained in the cemented carbide. If the Co content is reduced in order to prevent this, the toughness of the cemented carbide is lowered to easily cause chipping during cutting.

(2) Since linear expansion coefficients of diamond and the cemented carbide are extremely different from each other, the adhesion strength of the diamond coating layer is reduced due to residual stress, such that the coating layer itself is separated from the base material when its thickness exceeds 20 $\mu$m. Such separation is also easily caused during cutting even if the coating layer has a small thickness.

On the other hand, material requirements for printed circuit boards have been so varied that there has been developed an extremely hard material, which is mainly composed of ceramic resin etc., having a Vickers hardness exceeding 100.

To this end, the aforementioned microdrill bit of WC-based cemented carbide (Vickers hardness: about 1500) or surface-coated WC-based cemented carbide (Vickers hardness: about 2000 to 2500) is so insufficient in hardness that it is impossible to attain a high wear resistance. Further, since such a microdrill bit has an elongated configuration with a small diameter of not more than 5 mm, or not more than 3 mm in general, chipping may be caused in a short time or the hard coating layer may be separated or significantly worn if the drill bit is used under severe operating conditions. In addition, the material, such as ceramic resin, for the printed circuit board is easily deposited onto the tip of a cutting portion of the drill bit. Thus, the conventional microdrill bit cannot satisfy necessary cutting performance requirements.

In the case of a drill bit having a cutting portion and a shank which are integrated with or inseparably connected with/fixed to each other, the following problems are encountered:

A cutting portion and a shank of a drill bit are used under different load conditions. Therefore, different characteristics are required for the respective parts of such a drill bit. For example, wear resistance and adhesion resistance are required for a tip of the cutting portion, while toughness for maintaining strength of the tool is required for the shank. Further, the tip of the cutting portion must have different characteristics in its central portion and in its outer peripheral portions thereof, since these portions are driven at different cutting speeds.

When a drill bit whose cutting portion is coated in order to satisfy such complicated requirements for the characteristics, is resharpened for general use, the coating layer is inevitably separated at least from a front flank side, and hence most of the coating effect is lost.

On the other hand, a drill bit which is formed by brazing cemented carbide to its cutting portion, cannot be used for deep hole drilling of a hard to cut material. If the shank is made of steel, there is a significant difference between the thermal expansion coefficients of the steel and the cemented carbide forming the cutting portion, to easily cause splitting or cracking during the brazing.

In recent years, a cemented carbide material for the shank of a drill bit has been brought into a coarse grain or high binder phase state, in order to improve the toughness of the shank. In that case, however, the strength of the material is reduced or the distortion of an elastic limit is reduced, and hence the shank is undesirably broken during perforating, due to vibration of a workpiece, due to an unstable rotation of a cutting machine, or the like.

On the other hand, in a drill bit of diamond-coated cemented carbide, the coating is separated in an initial operating stage due to an insufficient adhesion strength between the diamond coating layer and the cemented carbide. Hence, it is impossible to improve the wear resistance in the manner described.

When a twist drill bit having a base material of a silicon nitride based ceramic sintered body, is coated with diamond, the possibility of separation of the diamond coating layer is greatly reduced. However, such a twist drill bit tends to break under severe cutting conditions, due to an insufficient strength of the sintered body. This drawback also applies to a diamondcoated drill bit made of a base material of ceramic such as alumina or SiC.

While a drill bit formed by inseparably and integrally connecting the aforementioned cutting portion and shank, can be continuously used by resharpening the cutting portion after every prescribed operating time, the frequency of such resharpening is restricted, and the cost is increased due to the time needed for resharpening. Further, the sharpness and the tool life are varied depending on the conditions of the resharpening operation. In addition, it is necessary to successively correctly comprehend the length of the drill bit in response to a numerical control and the automation of a cutting machine to which the drill bit is applied. Thus, the length of the drill bit must be measured by a complicated operation every time the same is resharpened.

SUMMARY OF THE INVENTION

A first object of the present invention is to provide a drill bit which has an excellent wear resistance, toughness and work piece contact resistance.

A second object of the present invention is to provide a drill bit having an excellent wear resistance and deposition resistance in drilling of an Al-Si alloy or a printed circuit board under severe conditions to attain a longer tool life than a conventional drill bit.

A third object of the present invention is to provide a microdrill bit of a diamond-coated $Si_3N_4$ sintered body showing excellent wear resistance, deposition resistance and toughness in drilling of a printed circuit board to attain a longer tool life than a conventional drill bit.

A fourth object of the present invention is to provide a throwaway tipped drill bit comprising an insert which is excellent in wear resistance as well as deposition resistance, and a shank which has sufficient toughness against breakage, without requiring resharpening for continuous use.

The present drill bit of a diamond-coated sintered body for attaining the aforementioned first object comprises a base material of a sintered body mainly composed of silicon nitride and/or carbon nitride and a diamond coating layer of at least 0.1 $\mu$m in thickness which is formed on at least a portion, being worn upon working, of the surface of the base material.

According to this structure, the present drill bit has an excellent toughness due to the tough base material. Since the base material has a linear expansion coefficient which is substantially equal to that of diamond, the diamond coating layer is hardly separated. Further, this drill bit is improved in its wear resistance due to the high hardness of diamond, while its deposition resistance is improved due to the high thermal conductivity.

The present drill of a diamond-coated sintered body for attaining the aforementioned second object, has a substrate of an $Si_3N_4$ sintered body being mainly composed of $Si_3N_4$ and containing 0.01 to 30 percent by weight of at least one of MgO, $Y_2O_3$, $Al_2O_3$, AlN, $ZrO_2$, $HfO_2$, TiC, TiN, $B_4C$, BN and $TiB_2$ to be not more than 50 percent by weight of the total. A diamond coating layer of at least 0.1 $\mu$m in thickness is formed on the surface of the substrate.

In the present drill bit of a diamond-coated $Si_3N_4$ sintered body, the substrate of the $Si_3N_4$ sintered body is superior in hardness to cemented carbide, excellent in wear resistance, and its linear expansion coefficient is substantially identical to the linear expansion coefficient of diamond. Therefore, no residual stress is caused in the diamond coating layer, whereby the latter can attain excellent adhesion with respect to the substrate even if its thickness exceeds 20 $\mu$m. Further, the diamond coating layer has an excellent wear resistance, as well as a deposition resistance with respect to a workpiece such as an Al-Si alloy or a printed circuit board.

If the thickness of the diamond coating layer is less than 0.1 $\mu$m, it is impossible to attain the effects of wear resistance and deposition resistance by the diamond coating. However, it is unnecessary and uneconomic to provide a diamond coating layer having a thickness exceeding 200 $\mu$m.

While it is known that $Si_3N_4$ has an inferior degree of sintering since the same is a covalent material, it is possible to obtain a sufficiently dense and hard $Si_3N_4$ sintered body as a substrate for a drill bit for perforating an Al-Si alloy or a printed circuit board, by sintering the material with an addition of at least one of MgO, $Y_2O_3$, $Al_2O_3$ and AlN. Further, it has been found that such an $Si_3N_4$ sintered body is improved in strength at elevated temperature with an addition of $ZrO_2$ and/or $HfO_2$, while the same is improved in wear resistance with an addition of TiC, TiN, $B_4C$, BN and/or $TiB_2$.

The additional amount of each such sintering assistants is in a range of 0.01 to 30 percent by weight. The additional amount is restricted within this range since no additional effect is attained if the amount is less than 0.01 percent by weight, while the wear resistance is reduced by MgO, $Y_2O_3$, $Al_2O_3$ and AlN outside this range. The toughness is reduce by $ZrO_2$, $HfO_2$, TiC, TiN, $B_4C$, BN and $TiB_2$ exceeding 30 percent by weight. If the total additional amount of these sintering assistants exceeds 50 percent by weight, strength of the $Si_3N_4$ sintered body is reduced.

A method of producing such an $Si_3N_4$ sintered body is similar to an ordinary one except for the sintering assistant(s) and the additional amount(s) thereof. For example, a pressed body of $Si_3N_4$ powder mixed with the above sintering assistant(s) is sintered in a non-oxidizing atmosphere at 1650° to 1900° C.

The present microdrill bit of a diamond-coated sintered body for attaining the aforementioned third object comprises a substrate of an $Si_3N_4$ sintered body which is mainly composed of columnar crystals of $Si_3N_4$ having breadths of not more than 1 $\mu$m and containing 0.01 to 30 percent by weight of at least one of MgO, $Y_2O_3$, $Al_2O_3$, AlN, $ZrO_2$, TiC, TiN, $B_4C$, BN and $TiB_3$, and a diamond coating layer of at least 0.1 $\mu$m in thickness provided on the surface of the substrate.

In this microdrill bit of a diamond-coated sintered body, the substrate is made of an $Si_3N_4$ sintered body and the thickness of the diamond coating layer is restricted to be at least 0.1 $\mu$m, for reasons similar to the above. Further, it is unnecessary and uneconomic to provide a diamond coating layer having a thickness exceeding 200 $\mu$m also similarly to the above, and the thickness of the diamond coating layer is preferably not more than 100 $\mu$m, particularly in the case of a microdrill bit for perforating a printed circuit board. The effect of the additional sintering assistant(s) and the reason for their restriction within the stated ranges are also similar to the above.

The present microdrill bit of a diamond-coated sintered body is different from the aforementioned drill bit of a diamond-coated sintered body in a point that $Si_3N_4$ defining the main component of the sintered body, has a columnar crystal structure of not more than 1 $\mu$m in breadth. It has been found that, when mixed powder of $Si_3N_4$ powder and the sintering assistant(s), is sintered in a gaseous nitrogen atmosphere of at least 3 atm. at a sintering temperature of not more than 1850° C. for a sintering time of not more than 3 hours, the as-formed $Si_3N_4$ sintered body has a columnar crystal structure of not more than 1 $\mu$m in breadth and a greatly improved toughness. Even if the microdrill bit has a small diameter of not more than 5 mm, to be used for perforating of a printed circuit board, in particular, a sufficient toughness is attained together with an extremely long life. When $Si_3N_4$ power obtained by an imide decomposition method, is employed as a raw material, the crystal grains are refined to further improve the toughness.

The present drill bit of a diamond-coated sintered body for attaining the aforementioned fourth object, is in the form of a throw-away tipped drill bit which comprises an insert for cutting a workpiece and a shank to be mounted in a prescribed position of a cutting machine, and the insert is mechanically connected with the shank in a manner permitting again disconnecting the insert from the shank. The insert is formed as a diamond-coated sintered body having a substrate of a sintered body which is mainly composed of $Si_3N_4$ and/or SiC. In the surface of the substrate, at least the cutting edge of the insert is coated with diamond. The shank is preferably made of steel.

It has been found that a diamond coating layer shows an extremely high adhesion strength when at least a part of the surface of the silicon nitride based ceramic, sintered in such a way so that at least the surface sintered portion is coated with diamond. A similar effect is attained also when freely grown columnar crystals of silicon nitride are present in at least a part of the interface between the base material and the coating layer. It is possible that the surface of the base material is irregularized when the same is surface sintered or provided with columnar crystals, whereby the contact area between the base material and the diamond coating layer is increased to improve the adhesion strength. In order to implement such a state, mixed powder may be formed and sintered so that the as-formed sintered body is provided with a diamond coating layer on its surface, or such a sintered body may be brought into a desired final configuration to have required dimensions by grinding etc. and again heat treated so that the same is provided with columnar crystals of silicon nitride on its surface. More specifically, it is preferable to sinter the powder in a temperature range of 1600° to 2000° C. in an $N_2$ gas atmosphere of 1 to 3000 atm. for 30 minutes to 5 hours. After such sintering, it is preferable to perform a heat treatment in a temperature range of 1300° to 2000° C. in an $N_2$ gas and/or inert gas atmosphere of 1 to 3000 atm. To satisfy the requirement for a dimensional accuracy, the overall surface may be surface sintered and the base material of the sintered body may be partially ground.

A diamond coating layer on a heat treated surface exhibited a high adhesion strength similarly to that on a sintered surface. This feature is due to freely grown columnar crystals of silicon nitride present in both cases.

The diamond coating layer of the insert is preferably at least 0.1 $\mu$m and not more than 200 $\mu$m in thickness.

An effect similar to the above can be also attained when the coating layer is formed of a carbon having a diamond-structure in place of diamond, the coating layer contains another element such as boron or nitrogen, or the coating layer is in the form of a multiple layer. A good effect is also expected from a coating layer containing boron nitride. Such an effect remains unchanged even if some heat treatment is performed after the coating layer is provided. A similar effect can be also attained when at least one surface coating layer is of a carbide, a nitride or a carbo-nitride of titanium or $Al_2O_3$ provided on the coating layer. The surface layer is preferably flattened with a diamond grindstone or the like.

Figures 2A, 2B:
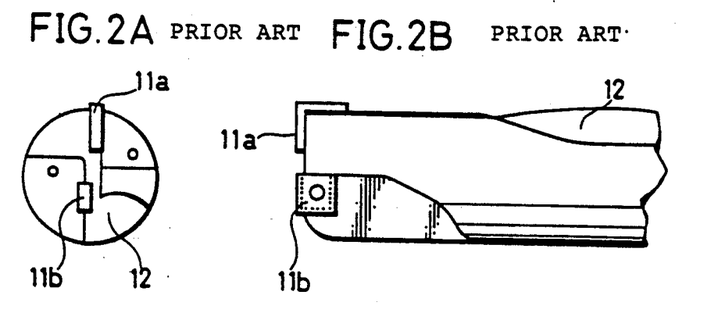
FIG. 2A is a front elevational view showing a two-flute drill bit having a throw-away tip secured by screws to the shank as is conventional.
FIG. 2B is a right side elevational view of the drill bit shown in FIG. 2A.
Figure 2C:
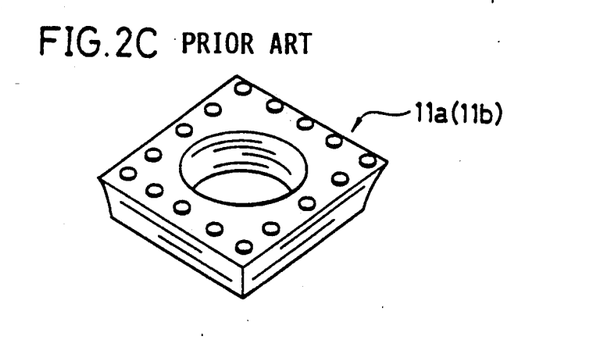
FIG. 2C is a perspective view showing an insert on an enlarged scale.
Figure 3:
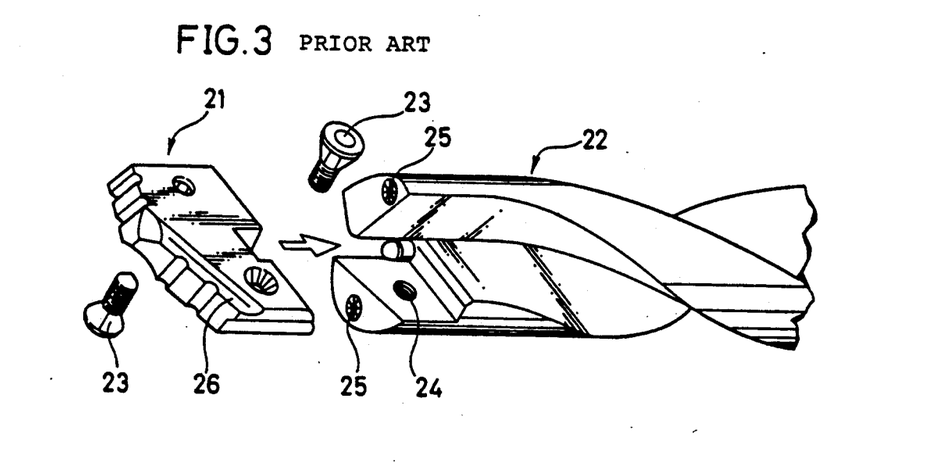
FIG. 3 is an exploded perspective view showing a throw-away tipped drill bit with one-flute.
Figure 4:
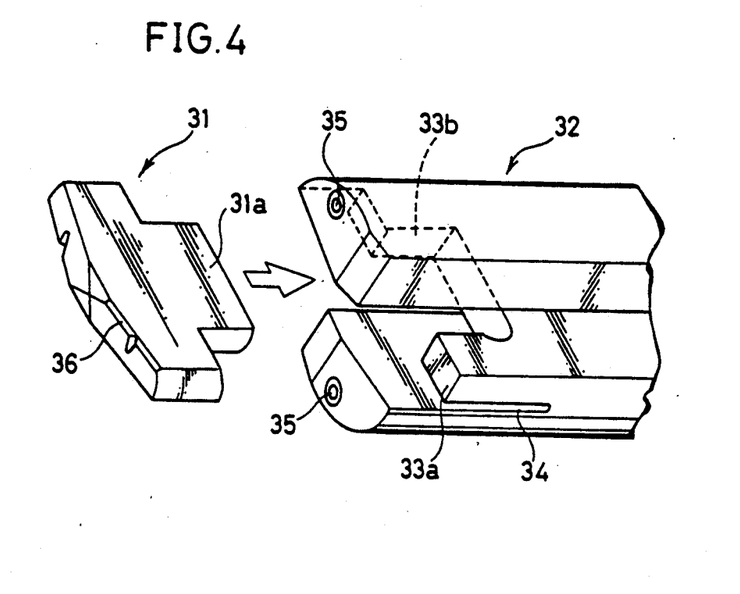
FIG. 4 is an exploded, enlarged scale, perspective view showing a connection part of a so-called self-grip type drill bit with a throw-away tip.
Figure 5A:
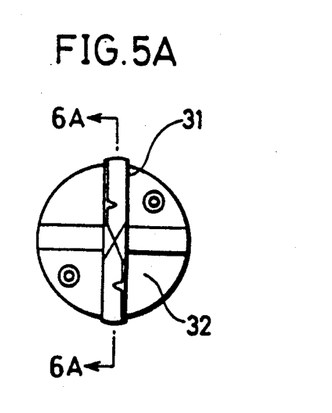
FIG. 5A is a front elevational view of the self-grip type throw-away tipped drill bit shown in FIG. 4.
Figure 5B:
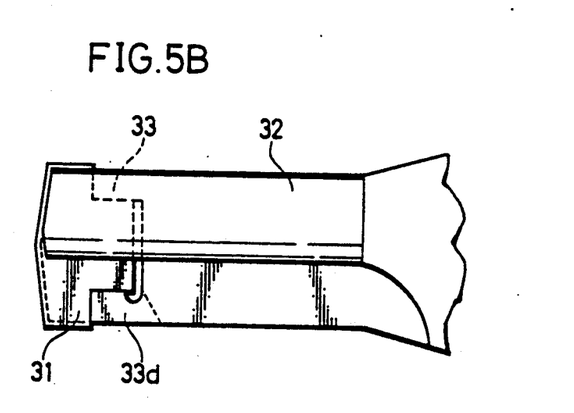
FIG. 5B is a right side elevational view thereof.

An insert and a shank of the present throw-away tipped drill bit are connected with each other mainly in three systems shown in FIGS. 2A to 2C, FIG. 3, FIGS. 9A and 9B illustrating a so-called spade drill bit, and FIGS. 4, 5A and 5B. In these figures, FIGS. 2A to 2C show a two-flute throw-away tipped drill bit. In this drill bit, inserts 11a and 11b are fixed by screwing to outer and inner peripheral portions of a forward end of a shank 12 respectively. On the other hand, FIG. 3 shows a typical example of a one-flute throw-away tipped drill bit having an insert 21 fitted in a shank 22 as shown by an arrow, and fixed through a screw 23 passing through a hole 24. A coolant supply hole 25 directly supplies a coolant to the tip of the insert 21. Further, a chip breaker 26 is provided on the cutting edge of the insert 21, in order to part chips. Such a chip breaker 26 may not be provided, depending on the purpose. In the spade drill shown in FIGS. 9A and 9B, an insert 41 is joined to a shank 42 with a screw 43.

Figure 6A:
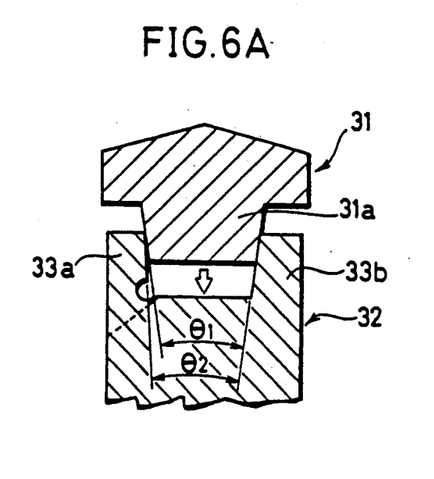
FIG. 6A is a sectional view taken along the line 6—6 in FIG. 5A, for illustrating the press fitting of an insert in a shank at the beginning of the insertion of the throwaway tip shown in FIG. 4.
Figure 6B:
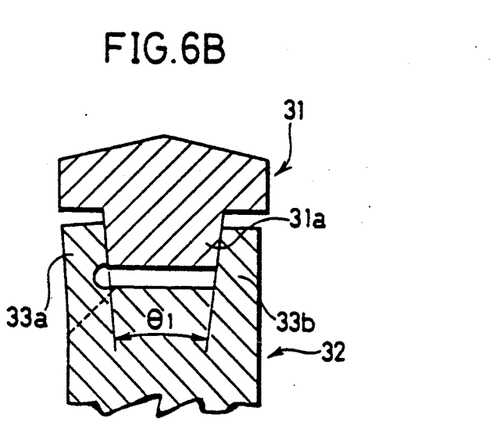
FIG. 6B is a similar sectional view for illustrating the completed insertion of the insert when the insert is fixed to the shank 32.

In a drill bit shown in FIGS. 4, 5A and 5B, an insert 31 is fitted in a shank 32 along an arrow as shown in FIG. 4, so that the insert 31 and the shank 32 are connected with each other without a screw or the like, in a so-called self-grip system. In the state shown in FIGS. 5A and 5B, the insert 31 and the shank 32 are connected with each other by this self-grip system. In such a connection state, side portions of a held portion 31a of the insert 31 are brought into contact with inner end surfaces of holding portions 33a and 33b of the shank 32 to cause a frictional force, whereby the insert 31 is fixed to the shank 32. With reference to FIGS. 6A and 6B, the state of such connection of the insert 31 and the shank 32 caused by an engagement there-between, is explained as follows: Before the insert 31 is engaged with the shank 32, and angle $\theta_1$ formed by the left and right side portions of the held portion 31a is slightly greater than an angle $\theta_2$ formed by the opposite inner end surfaces of the holding portions 33a and 33b. When the insert 31 is press-fitted in the shank 32, the angle $\theta_2$ is gradually expanded by a wedge action due to tapering of the left and right side portions of the held portion 31a and due to a slit 34 shown in FIG. 4 and provided on the holding portion 33a. When $\theta_1 > \theta_2$, the held portion 31a is in contact with the holding portion 33b only at an upper end of the inner end surface of the holding portion 33a. When $\theta_2$ reaches $\theta_1$, the contact areas between both side portions of the held portion 31a and the inner end surface of the holding portion 33a are maximized as shown in FIG. 6B. The press fitting operation is stopped in this state, and the holding portion 33a is elastically deformed to cause a pressing force in the contact surfaces of the same and the held portion 31a, so that the insert 31 is connected with and fixed to the shank 32 by frictional force between the contact surfaces.

A coolant supply hole 35 directly supplies a coolant to the cutting edge of the insert 31. Further, a chip breaker 36 is provided on the cutting edge of the insert 31, in order to part chips. Such a chip breaker 36 may not be provided, depending on the purpose.

Figure 7:
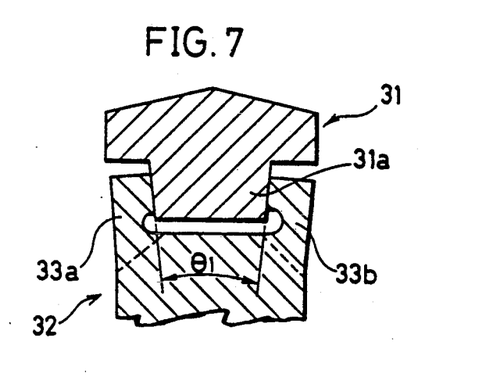
FIG. 7 is a sectional view illustrating another example of a connection of a throw-away tip to a drill bit shown in FIG. 4, which is provided with slits on both sides of holding portions 33a and 33b.

FIG. 7 shows another example of a shank 32, which is provided with slits 33 not only in a holding portion 33a but in another holding portion 33b. In this case, an insert 31 is press-fitted in the shank 32 so that both holding portions 33a and 33b are simultaneously expanded, thereby holding a held portion 31a by elastic force thereof.

Characteristics required for a drill bit are roughly classified into wear resistance and deposition resistance for an insert, and a breakage resistance, which is represented by toughness of a shank. According to the present invention, at least the cutting edge of the insert is formed of a diamond-coated sintered body, whereby the insert is improved in wear resistance, deposition resistance and toughness. This is so because diamond, forming a coating layer, is extremely hard and has an excellent thermal conductivity compared with WC and $Al_2O_3$, which are generally employed as main components for tool materials, and a sintered body, which is mainly composed of $Si_3N_4$ or SiC, forming a base material has a high strength as well as a high diamond evaporation strength since its thermal expansion coefficient is approximately the same as that of diamond, whereby no separation is caused.

It is preferable to prepare the shank of steel, which is excellent in toughness and breakage resistance, in order to reduce the material cost.

In the drill according to the present invention, the insert and the shank are mechanically connected with each other in a manner that can be disconnected again, whereby it is possible to easily disengage and throw away the insert, which is relatively damageable and short-lived. Further, the insert can be relatively simplified in its configuration, whereby it is possible to employ a hardly worked material such as a silicon nitride based ceramic as a base material. In addition, the insert can be manufactured by injection molding.

The thickness of the diamond coating layer is preferably in a range of 0.1 $\mu$m to 200 $\mu$m, since no effect of improving the wear resistance is attained if the thickness is smaller than 0.1 $\mu$m, while the degree of such improvement of wear resistance is not further increased if the thickness exceeds 200 $\mu$m. Thus, it is not advantageous to provide a diamond coating layer having a thickness exceeding 200 $\mu$m.

These and other objects, features, aspects and advantages of the present invention will become more apparent from the following detailed description of the present invention when taken in conjunction with the accompanying drawings.

DESCRIPTION OF THE PREFERRED EMBODIMENTS AND OF THE BEST MODE

The invention is applicable to any of the shown drill bits. In the first Example of the invention, $Si_3N_4$ powder materials were sufficiently mixed with sintering assistants listed in Table 1, formed under pressure of 1 ton/cm² and thereafter sintered in an $N_2$ gas atmosphere at 5 atm. and at a temperature of 1850° C. for 2 hours, thereby preparing drills of $Si_3N_4$ sintered bodies having inserts of 10.0 mm in outer diameter and 90.0 mm in length in accordance with JIS B4301.

TABLE 1

| Sample No. | Composition of Sintering Assistant (wt. %) |
|---|---|
| 1 | $2Al_2O_3$ - $4Y_2O_3$ |
| 2 | $2Al_2O_3$ - $2AlN$ - $2Y_2O_3$ - $1 ZrO_2$ |
| 3 | $4MgO$ - $3Y_2O_3$ |
| 4 | $3Al_2O_3$ - $3Y_2O_3$ - $2B_4C$ |
| 5 | $3Al_2O_3$ $3Y_2O_3$ |

As to the sample No. 5, the as-formed drill bit was heat treated at 1700° C. in an $N_2$ gas atmosphere at 5 atm. for one hour, and it was confirmed that the drill bit was provided on its surface with a large number of freely grown silicon nitride columnar crystals of 1 to 1.5 μm in breadth and 3 to 5 μm in length.

Diamond coating layers of 1.0 to 50 μm in thickness were formed on the surfaces of the $Si_3N_4$ sintered body drill bits as shown in Table 2, with a well-known low-pressure vapor phase synthesizing method (heat filament method) under the following conditions:

Reaction Vessel, silica tube of 200 mm in diameter
Filament Material: metal tungsten
Filament Temperature: 2400° C.
Filament-to-Drill Edge Distance: 10.0 mm
Total Pressure: 100 Torr
Atmosphere Gas: $H_2$-1% $CH_4$ gas
Time: 0.5 to 10 hours The as-formed diamond-coated $Si_3N_4$ sintered bodies of the drill bits (samples Nos. 1 to 5) were subjected to drilling tests for Al-Si alloys under the following conditions:

Workpiece: A 390
Cutting Speed: 90 m/min.
Feed Rate: 0.23 mm/rev.
Depth of Cut: 62.0 mm
Cutting Oil: not used In the drilling tests, the drill bits were subjected to cutting until the same were broken or worn. The number of drilled holes were counted. After termination of such working, the edges of the drill bits were observed, and the "deposited states" of the workpieces were investigated.

Comparative samples were prepared as a WC-based cemented carbide drill bit (sample No. 6) having the same dimensions and configurations as the aforementioned drill bits of the invention, with a composition corresponding to JIS K10, and as a surface-coated WC-based cemented carbide drill bit (sample No. 7) provided with a TiN coating layer of 2.0 μm thickness formed by a well-known vacuum arc evaporation method. These comparative samples 6 and 7 were subjected to similar drilling tests.

Table 2 shows the results.

TABLE 2

| Sample No. | Thickness of Coating Layer (μm) | Number of Holes Drilled | State of Cutting Edge | Deposition of Workpiece |
|---|---|---|---|---|
| 1 | 3.5 | 1184 | Normal | No |
| 2 | 4.8 | 1276 | Slightly Chipped | No |
| 3 | 1.0 | 1592 | Normally Worn | No |
| 4 | 50.0 | 2020 | Slightly Chipped | No |
| 5 | 6.0 | 3240 | Normally Worn | No |
| 6* | — | 205 | Significantly Worn and Chipped | Yes |
| 7* | 3.5 | 321 | Significantly Worn, Coating Separated and Chipped | Yes |

(Note) *Comparative Sample

According to the second Example of the present invention $Si_3N_4$ powder materials and sintering assistants shown in Table 3 were sufficiently mixed with each other. The mixed powder materials were formed under pressure of 1 ton/cm² and thereafter sintered in an $N_2$ gas atmosphere at 5 atm. at 1800° for one hour, to prepare $Si_3N_4$ sintered bodies having drill bit configurations under JIS B4301, with inserts of 0.8 mm with an outer diameter and a length of 30.0 mm. Table 3 also shows breadths of columnar crystals of the $Si_3N_4$ sintered bodies.

TABLE 3

| Sample No. | $Si_3N_4$ Powder | Composition of Sintering Assistant (wt. %) | Structure (Breadth of Columnar Crystal: μm) |
|---|---|---|---|
| 8 | Ordinary Powder | $2Al_2O_3$ - $4Y_2O_3$ | 0.9 |
| 9 | Imide Decomposition Powder | $2Al_2O_3$ - $2AlN$ - $2Y_2O_3$ | 0.8 |
| 10 | Ordinary Powder | $4MgO$ - $2TiN$ - $2TiC$ | 0.9 |
| 11 | Ordinary Powder | $3MgO$ - $2B_4O$ - $2TiB_2$ | 0.9 |
| 12 | Ordinary Powder | $2Al_2O_3$ - $2AlN$ - $1HfO_3$ | 0.8 |
| 13 | Ordinary Powder | $2Al_2O_3$ - $2ZrO_2$ - $1TiN$ | 0.8 |
| 14 | Imide Decomposition Powder | $2Al_2O_3$ - $4Y_2O_3$ | 0.6 |
| 15 | Imide Decomposition Powder | $2Al_2O_3$ - $2AlN$ - $2Y_2O_3$ | 0.6 |
| 16 | Imide Decomposition Powder | $4MgO$ - $2TiN$ - $2TiC$ | 0.5 |
| 17 | Ordinary Powder | $2Al_2O_3$ - $4Y_2O_3$ | 0.9 |
| 18 | Imide Decomposition Powder | $2Al_2O_3$ - $4Y_2O_3$ | 0.7 |

The drill bits of samples Nos. 17 and 18 were heat treated at 1700° C. in an $N_2$ gas atmosphere at 5 atm. for 0.5 hours, and it was confirmed that the drill bits were provided on the surfaces thereof with large numbers of freely grown columnar crystals of silicon nitride having breadths of 0.5 to 1.0 μm and lengths of 1.5 to 3 μm.

The $Si_3N_4$ sintered bodies of samples Nos. 10 to 18 were coated with diamond coating layers having thicknesses shown in Table 4, by a well-known low-pressure vapor phase synthesizing method (heat filament method) under the following conditions:

Reaction Vessel: silica tube of 200 mm in diameter
Filament Material: metal tungsten
Filament Temperature: 2400° C.
Filament-to-Drill Edge Distance: 10.0 mm
Total Pressure: 100 Torr
Atmosphere Gas: $H_2$-1% $CH_4$ gas
Time: 0.5 to 10 hours The as-formed microdrill bits of the present diamond-coated $Si_3N_4$ sintered bodies (samples Nos. 10 to 18) were subjected to drilling tests by drilling holes into printed circuit boards under the following conditions:

Workpiece: printed circuit board of 6.5 mm in total thickness comprising three four-layer sheets held between an Al plate of 0.12 mm thickness and a bakelite plate of 1.6 mm thickness
Speed of Rotation: 60,000 r.p.m.
Cutting Speed: 4,000 mm/min.
Feed Rate: 50 μm/rev.

The number of holes drilled before the inner diameter surface roughness of the drilled holes reached 30 μm was counted. The measured surface roughness of 30 μm formed the basis for determining that the useful life of the respective drill bit has ended. After termination of such working, edges of the microdrill bits were observed, and deposited states of the workpieces were investigated.

Comparative samples were formed. Sample No. 19 was a WC-based cemented carbide microdrill bit having the same dimensions and configuration as the aforementioned microdrill bits with a composition corresponding to JIS K10. Sample No. 20 was a surface-coated WC-based cemented carbide microdrill provided with a TiN coating layer of 2.0 μm thickness formed by a well-known vacuum arc evaporation method. These comparative samples 19 and 20 were subjected to similar drilling tests by drilling holes into printed circuit boards.

Table 4 shows the results.

TABLE 4

| Sample No. | Thickness of Coating Layer (μm) | Deposition of Workpiece | State of Cutting Edge | Number of Holes Drilled |
|---|---|---|---|---|
| 8* | — | slight | Slightly Chipped | 42600* |
| 9* | — | slight | Normally Worn | 52800 |
| 10 | 2.3 | No | Slightly Chipped | 76400 |
| 11 | 1.5 | No | Slightly Chipped | 80050 |
| 12 | 4.5 | No | Slightly Chipped | 84250 |
| 13 | 10.0 | No | Slightly Chipped | 90400 |
| 14 | 9.0 | No | Normally Worn | 98450 |
| 15 | 10.5 | No | Normally Worn | 97260 |
| 16 | 25.0 | No | Normally Worn | 100080 |
| 17 | 4.0 | No | Normally Worn | 131270 |
| 18 | 4.5 | No | Normally Worn | 154140 |
| 19* | — | Yes | Chipped | 6100 |
| 20* | TiN 3.5 | Yes | Separated, Worn and Chipped | 6520 |

(Note) *Comparative and Conventional Samples

From the results shown in Table 4, it is understood that the comparative microdrill bits of $Si_3N_4$ sintered bodies having no diamond coating layers (samples Nos. 8 and 9) were also improved in toughness, and that the microdrill bits of the invention having diamond-coated $Si_3N_4$ sintered bodies provided with diamond coating layers (samples Nos. 10 to 18) were extremely superior in wear resistance and deposition resistance to the conventional microdrill bits of samples 19 and 20.

Figure 8:
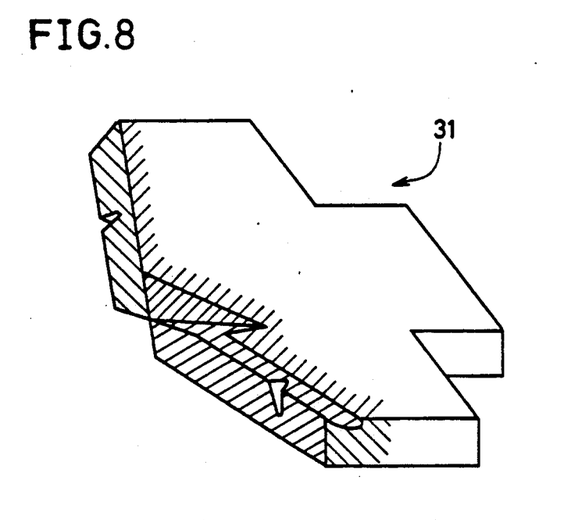
FIG. 8 is a perspective view showing an example of an insert for a throw-away tipped drill bit of the invention, which is coated with a diamond film in a portion most exposed to wear.

According to Example 3, each throw-away tipped drill bit of the invention was provided with an insert and a shank which were disengagably, mechanically connected with each other as shown in FIG. 4. The insert was formed by a base material of a silicon nitride based sintered body or a silicon carbide based sintered body, while the shank was made of steel. Table 5 shows the compositions of which the samples were made. In each sample, a diamond coating layer was formed on a portion of the insert along oblique lines shown in FIG. 8. It is necessary to form such a diamond coating layer at least one on rake face or on both rake faces and on a flank, depending on the workpieces to be drilled and on the working conditions. In the surface of the base material for the insert, the portion to be provided with a diamond coating layer was subjected to scarification by ultrasonic vibration for 5 minutes with diamond abrasive grains of 8 to 16 μm in size, as a general method of improving the initial nuclear growth density in the diamond coating. Table 5 also shows thicknesses of the diamond coating layers formed on the inserts of drill bits Nos. 1 to 6 according to the invention, which were prepared by a well-known heat filament CVD method under the following conditions. The diamond-coated surface of drill bit No. 5, was subjected to lapping for 5 hours with a diamond paste including diamond particles up to 3 μm in size, to attain an improvement in the surface roughness of the insert.

Diamond Coating Layer Forming Conditions:

Reaction Vessel: silica tube of 200 mm in diameter
Filament Material: metal tungsten
Filament Temperature: 2400° C.
Filament-to-Insert Distance: 8 mm
Total Pressure: 60 Torr
Atmosphere Gas: mixed gas of $H_2$ and 1% $CH_4$
Coating Time: 2 to 100 hours Comparative drill bits were prepared with an insert of a silicon nitride based ceramic provided with no diamond coating layer and an insert of cemented carbide according to JIS P30 provided with a TiN coating layer of 3.0 μm thickness. Further, additional comparative drill bits were prepared as so-called twist drill bits (see FIG. 1) of JIS P30 cemented carbide and silicon nitride based ceramic provided with diamond coating layers. Table 5 shows the compositions of the base materials for the inserts, materials for the shanks and thicknesses of the diamond coating layers for the inserts.

TABLE 5

| Sample Tool | Composition of Base material for Insert (wt. %) | Material for Shank | Thickness of Diamond Coating Layer |
|---|---|---|---|
| Invention Drill Bits | | | |
| 1 | $Si_3N_4$ (95), $Al_2O_3$ (3), $Y_2O_3$ (2) | SCM435 | 4 |
| 2 | $Si_3N_4$ (95), $Al_2O_3$ (3), $Y_2O_3$ (2) | SKS2 | 20 |
| 3 | $Si_3N_4$ (95), $Al_2O_3$ (2), $Y_2O_3$ (2) $ZrO_2$ (1) | SCM435 | 12 |
| 4 | $Si_3N_4$ (94), MgO (2), $Y_2O_3$ (2) | SKH51 | 35 |
| 5 | $Si_3N_4$ (95), $Al_2O_3$ (2), $Y_2O_3$ (2) $B_4C$ (2) | SCM435 | 100 |
| 6 | SiC (98.8), B (0.5), C (0.7) | SCM440 | 60 |
| 7 | $Si_3N_4$ (94), $Al_2O_3$ (3), $Y_2O_3$ (3) | SCM435 | 10 |
| 8 | $Si_3N_4$ (94), $Al_2O_3$ (3), $Y_2O_3$ (2) | SCM435 | 20 |
| Comparative Drill Bits | | | |
| 1 | $Si_3N_4$ (95), $Al_2O_3$ (3), $Y_2O_3$ (2) | SCM435 | — |
| 2 | P30-Grade Cemented Carbide Coated with TiN | SCM435 | — |
| 3 | P30-Grade Cemented Carbide Drill (FIG. 1) | — | 8 |
| 4 | $Si_2N_4$ (94), MgO (4), $Y_2O_3$ (2) (FIG. 1) | — | 22 |

The drill bits Nos. 7 and 8 of the invention were heat treated at 1710° C. in an $N_2$ gas atmosphere at 5 atm. for one hour, and it was confirmed that the surfaces of the drill bits were provided with large numbers of freely grown columnar crystals of silicon nitride having breadths of 1.0 to 2.0 μm and lengths of 4.0 to 10.0 μm.

Cutting performance tests were made on drill bits of 8 mm in diameter under the following conditions:
- Workpiece: A 390 (93 wt.% of Al and 7 wt.% of Si)
- Cutting Speed: 100 mm/min. (water soluble cutting oil)
- Feed Rate: 0.3 mm/rev.
- Depth of Cut: 45 mm
- Criterion: Cutting Edge state etc. were observed after working up to the end of the useful life of the drill bits
- Life: Generally regarded as ended when the outer peripheral flank was worn by 0.2 mm.

Table 6 shows the results of the performance evaluation tests for the drill bits. It is understood from these results that the present drill bits were superior in wear resistance and toughness to the comparative drill bits. This is so because the diamond coating layers of the present drill bits were excellent in adhesion strength and the shanks thereof were excellent in toughness.

Figure 9A:
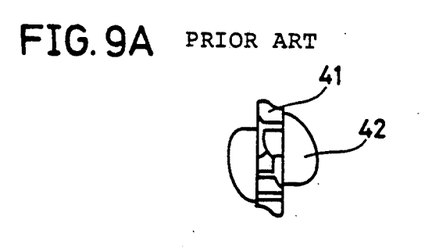
FIG. 9A is a top plan view showing a general structure of a spade drill defined under JIS, to which the present invention is applied.
Figure 9B:
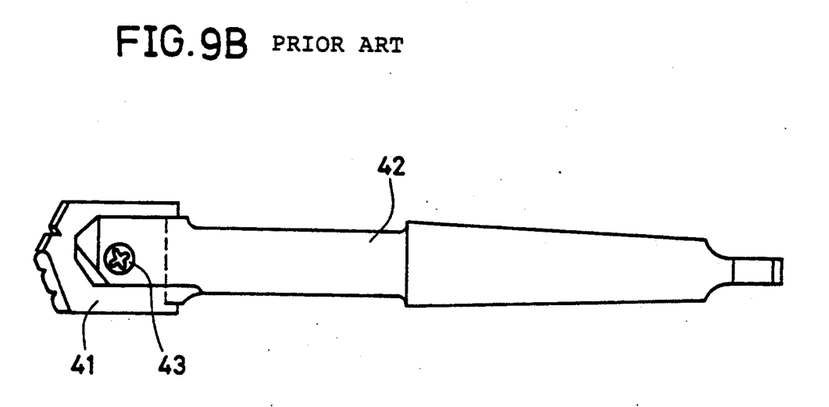
FIG. 9B is a left side elevational view of the spade drill shown in FIG. 9A.

According to a fourth Example, samples having the same inserts, shanks and diamond coating layers as the present drill bit No. 1 in Example 3, where employed and subjected to cutting tests in relation to the following four methods of connecting the inserts to the shanks:
- Present Drill bit A: self-grip type shown in FIG. 4
- Present Drill bit B: two-flute screwed drill bit shown in FIGS. 2A to 2C
- Present Drill bit C: one-flute screwed drill bit shown in FIG. 3
- Present Drill bit D: one-flute screwed drill bit shown in FIGS. 9A and 9B (JIS spade drill bit).

A comparative drill bit having a brazed cemented carbide insert, which was out of the scope of the present invention, was also subjected to a cutting test under similar conditions to those for the four types of present drill bits, for comparing the cutting characteristics. The cutting conditions were as follows:
- Workpiece: AC4C
- Cutting Speed: 50 m/min. and 150 m/min (water soluble cutting oil)
- Feed Rate: 0.1 mm/rev.
- Depth of Cut: 40 mm
- Diameter of Worked Hole: 20 mm

TABLE 6

| Cutting Tool | Number of Drilled Holes | State of Cutting Edge |
|---|---|---|
| Invention Drill Bits | | |
| 1 | 1220 | Normally Worn |
| 2 | 1345 | Normally Worn |
| 3 | 1180 | Normally Worn |
| 4 | 1420 | Normally Worn |
| 5 | 1623 | Normally Worn |
| 6 | 1250 | Normally Worn |
| 7 | 2280 | Normally Worn |
| 8 | 2810 | Slightly Worn |
| Comparative Drill Bits | | |
| 1 | 315 | Workpiece Significantly Adhered |
| 2 | 260 | Workpiece Significantly Adhered |
| 3 | 270 | Diamond Coating Layer Significantly Separated |
| 4 | | Initially Broken |

Table 7 shows the results of the performance evaluation in this Example 4. Cutting characteristics, represented by stability, can be regarded excellent as horizontal load components, thrusts and torque values of a cutting balance acting on the drill bits by the cutting resistance shown in Table 7 are reduced and values of the speed dependency are also reduced. It is understood from the results shown in Table 7 that the present drill bits A to D are superior in characteristics to the comparative drill bit E. The present drill bits A and B have particularly excellent characteristics.

TABLE 7

| | | Compared Characteristics | | | | | | |
|---|---|---|---|---|---|---|---|---|
| | | Cutting Balance (Horizontal Component) (N) | | Thrust (N) | | Torque (J) | Hole Diameter Over Bit Size(μm) | Remarks |
| | | Cutting Speed V (m/min.) | | | | | | |
| | | 50 | 150 | 50 | 150 | 50 | 150 | |
| Invention Drill Bits | | | | | | | | |
| A | Self-Grip Type | 80 | 70 | 1000 | 1000 | 1400 | 25 | Throw-Away type Shown in FIG. 4. |
| B | Two-Flute Screwed Type | 120 | 110 | 1100 | 1100 | 1750 | 30 | Throw-Away Type Shown in FIG. 2A to 2C |
| C | One-Flute Screwed Type | 190 | 160 | 2200 | 2100 | 1850 | 35 | Throw-Away Type Shown in FIG. 3. |
| D | Spade type | 200 | 180 | 2400 | 2200 | 1900 | 50 | Throw-Away Type Shown in FIG. 3. |
| Comparative Drill Bits | | | | | | | | |
| E | Brazed Type with Cutting Edge of Cemented Carbide | 80 | Unmeasurable | 2000 | Unmeasurable | 2900 | 30 | Helical Flute, Cross Thinning, Resharpening Available 4 Times. Incapable of Parting Chips and Broken at V = 150 |

(Note) Materials for inserts and shanks of present samples A, B and C and thicknesses of diamond Coating Layers are identical to those of present drill bit 1 in Table 5.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A drill bit, comprising a diamond-coated sintered body, said sintered body being composed of a member selected from the group consisting of silicon nitride and silicon carbide; and a diamond coating layer of at least 0.1 μm thickness formed on at least a drill bit surface portion exposed to wear when said drill bit drills a hole, and wherein at least a part of said surface portion is surface sintered when said diamond coating layer is provided on said surface portion so that at least said surface sintered portion is coated with diamond.

2. The drill bit of claim 1, wherein said diamond coating layer has a thickness of 200 μm at the most.

3. A drill bit, comprising a diamond-coated sintered body formed as a sintered substrate mainly of $Si_3N_4$ and additionally containing 0.01 to 30 percent by weight of at least one member selected from the group consisting of MgO, $Y_2O_3$, $Al_2O_3$, AlN, $ZrO_2$, $HfO_2$, TiC, TiN, $B_4C$, BN and $TiB_2$, whereby a total weight percentage of said members of said group is not more than 50 percent by weight, and a diamond coating layer of at least 0.1 μm thickness provided on at least a surface portion of said substrate, and wherein said surface portion is surface sintered when said diamond coating layer is provided on said surface portion of said substrate, so that at least said surface sintered portion is coated with diamond.

4. The drill bit of claim 3, wherein said diamond coating layer has a thickness of 200 μm at the most.

5. A microdrill bit, comprising a diamond-coated $Si_3N_4$ sintered body formed as a sintered substrate mainly of $Si_3N_4$, said $Si_3N_4$ having a columnar crystal structure of not more than 1 μm in breadth, said sintered substrate further containing 0.01 to 30 percent by weight of at least one member selected from the group consisting of MgO, $Y_2O_3$, $Al_2O_3$, AlN, $ZrO_2$, $HfO_3$, TiC, TiN, $B_4C$, BN and $TiB_2$, whereby a total weight percentage of said members of said group is not more than 50 percent by weight, and a diamond coating layer of at least 0.1 μm thickness provided on at least a portion of the surface of said substrate.

6. The microdrill bit of claim 5, wherein said diamond coating layer has a thickness of 200 μm at the most.

7. The microdrill bit of claim 5, wherein said $Si_3N_4$ sintered body is prepared of a raw material obtained by an imide decomposition method forming $Si_3N_4$ powder.

8. The microdrill bit of claim 5, wherein at least a part of the surface of said substrate is surface sintered when said diamond coating layer is provided on said surface portion of said substrate, so that at least said surface sintered portion is coated with diamond.

9. The microdrill bit of claim 5, wherein freely grown columnar crystals of silicon nitride are present in at least a part of an interface between said substrate and said diamond coating layer when said diamond coating layer is provided on the surface of said substrate.

10. A throw-away tipped drill bit comprising a shank (22, 32) and an insert (21, 31) for cutting a work piece, means for mechanically and releasably connecting said insert with said shank, said insert comprising a diamond-coated sintered body mainly composed of a member selected from the group consisting of $Si_3N_4$ and SiC, at least a cutting edge of said insert being coated with one of diamond and diamond-structure carbon on the surface of said sintered body, and wherein at least a part of the surface of said base material is surface sintered when a diamond coating layer is provided on the surface of said substrate, so that at least said surface sintered portion is coated with diamond.

11. The throw-away tipped drill bit of claim 10, wherein said shank (22, 32) is made of steel.

12. The throw-away tipped drill bit of claim 10, wherein the layer thickness of said diamond coating of said insert (21, 31) is within the range of at least 0.1 $\mu$m and 200 $\mu$m at the most.

13. The throw-away tipped drill bit of claim 10, wherein said means for mechanically and releasably connecting comprise on said shank (22, 32) holding portions (33a, 33b) to be engaged with a held portion (31a) of said insert (21, 31) for holding said insert in place, so that said insert is fixed to said shank by an elastic force following an elastic deformation of said holding portions caused by an engagement between said insert and said shank.

14. The throw-away tipped drill bit of claim 10, wherein said means for mechanically and releasably connecting said insert (21, 31) to said shank (22, 32) comprise threads and screws engaging said threads.

15. A drill bit, comprising a diamond-coated sintered body, said sintered body being composed of a member selected from the group consisting of silicon nitride and silicon carbide; and a diamond coating layer of at least 0.1 $\mu$m thickness formed on at least a drill bit surface portion exposed to wear when said drill bit drills a hold, and wherein freely grown columnar crystals of silicon nitride are present in at least a part of an interface between said sintered body and said diamond coating layer when said diamond coating layer is provided on said surface portion.

16. The drill bit of claim 15, wherein said diamond coating layer has a thickness of 200 $\mu$m at the most.

17. A drill bit, comprising a diamond-coated sintered body formed as a sintered substrate mainly of $Si_3N_4$ and additionally containing 0.01 to 30 percent by weight of at least one member selected from the group consisting of MgO, $Y_2O_3$, $Al_2O_3$, AlN, $ZrO_2$, $HfO_2$, TiC, TiN, $B_4C$, BN and $TiB_2$, whereby a total weight percentage of said members of said group is not more than 50 percent by weight, and a diamond coating layer of at least 0.1 $\mu$m thickness provided on at least a surface portion of said substrate, and wherein freely grown columnar crystals of silicon nitride are present in at least a part of an interface between said sintered body and said diamond coating layer when said diamond coating layer is provided on said surface portion.

18. The drill bit of claim 17, wherein said diamond coating layer has a thickness of 200 $\mu$m at the most.

19. A throw-away tipped drill bit comprising a shank (22, 32) and an insert (21, 31) for cutting a work piece, means for mechanically and releasably connecting said insert with said shank, said insert comprising a diamond-coated sintered body mainly composed of a member selected from the group consisting of $Si_3N_4$ and SiC, at least a cutting edge of said insert being coated with one of diamond and diamond-structure carbon on the surface of said sintered body, and wherein freely grown columnar crystals of silicon nitride are present in at least a part of an interface between said sintered body and said diamond coating layer when said diamond coating layer is provided on said surface portion.

20. The throw-away tipped drill bit of claim 19, wherein said shank (22, 32) is made of steel.

21. The throw-away tipped drill bit of claim 19, wherein the layer thickness of said diamond coating of said insert (21, 31) is within the range of at least 0.1 $\mu$m and 200 $\mu$m at the most.

22. The throw-away tipped drill bit of claim 19, wherein said means for mechanically and releasably connecting comprise on said shank (22, 32) holding portions (33a, 33b) to be engaged with a held portion (31a) of said insert (21, 31) for holding said insert in place, so that said insert is fixed to said shank by an elastic force following an elastic deformation of said holding portions caused by an engagement between said insert and said shank.

23. The throw-away tipped drill bit of claim 19, wherein said means for mechanically and releasably connecting said insert (21, 31) to said shank (22, 32) comprise threads and screws engaging said threads.

* * * * *